B. F. FITCH.
MEANS FOR TRANSFERRING FREIGHT TO AND FROM ELECTRIC LINES.
APPLICATION FILED FEB. 23, 1918.

1,310,986.

Patented July 22, 1919.
5 SHEETS—SHEET 3.

INVENTOR,
Benjamin F. Fitch,
BY Baker Macklin, ATTYS.

UNITED STATES PATENT OFFICE.

BENJAMIN F. FITCH, OF EVANSTON, ILLINOIS, ASSIGNOR TO THE MOTOR TERMINALS COMPANY, OF CLEVELAND, OHIO, A CORPORATION OF OHIO.

MEANS FOR TRANSFERRING FREIGHT TO AND FROM ELECTRIC LINES.

1,310,986.     Specification of Letters Patent.     Patented July 22, 1919.

Application filed February 23, 1918. Serial No. 218,678.

*To all whom it may concern:*

Be it known that I, BENJAMIN F. FITCH, a citizen of the United States, residing at Evanston, in the county of Cook and State of Illinois, have invented a certain new and useful Improvement in Means for Transferring Freight to and from Electric Lines, of which the following is a full, clear, and exact description, reference being had to the accompanying drawings.

The ultimate object of this invention is to provide for the rapid and economical handling of freight transported particularly by trolley freight cars, but more particularly, the object is to provide a combination of trolley freight cars, automobile trucks and removable bodies adapted to be transported in a loaded condition by the trolley freight cars and transferred by power from the car to the frame of the truck for immediate delivery. Such a system enables the immediate deposit of goods from the arriving trolley car to a destination without breaking bulk.

A particular advantage of my invention arises from the fact that, in a great many cities, interurban trolley cars enter the city where ordinance or franchise prohibits the hauling of freight. By my system the interurban car may carry the freight to the city limit and then immediately transfer the load to a waiting truck which may haul it over the city streets and either to a city station or direct to the consignee. The transfer may be made quickly enough so that the trolley freight car may stand on the main track at the transfer point, and no freight house is required.

In carrying out my invention in its preferred form, I provide a trolley freight car having a flat platform and a vertical post rising from its center, which carries a crane arm and a hoisting mechanism and may also carry the usual trolley pole. Space is thus provided in front and behind the post for removable freight loading bodies, preferably one at the front and one at the rear. The crane arm may overhang either body and is adapted to lift it and swing it laterally to the side of the car and deposit it on a motor truck frame. Electric motors are provided for swinging the crane post and for raising the hoisting chain or cable, these motors being preferably fed by current from the trolley wire and controlled by a suitable controller.

With apparatus equipped as above explained, the removable bodies are loaded wherever desired and driven by automobiles or otherwise to the trolley car; then the crane lifts the body and transfers it to the car, after which the car is operated by the motorman in the usual manner to transport the load to the unloading point. Then, while the trolley is still engaged with the wire, the raising and swinging motors are operated to lift the loaded body, swing it to the side and deposit it on the awaiting automobile frame. Should there be no automobile frame available at the time the trolley arrives at the city limits or other unloading point, the loaded body may be simply lifted from the car and deposited on the ground alongside of the car to be subsequently raised and deposited on a truck by a subsequently arriving trolley freight car.

A preferred form of my invention is illustrated in the drawings hereof, and is hereinafter more fully explained, and the essential characteristics of the invention are set out in the claims.

As shown in Figs. 1, 2 and 3, 10 indicates the supporting floor or platform of my trolley car, 11 the wheels thereof, 12 the driving motors, 13 the central post carried by the body, 14 the trolley pole mounted on the usual trolley base 15 at the top of the post, and 16 the usual controllers for operating the motors which propel the car. The trolley pole is swiveled to its base 15 and drawn upwardly by a spring or springs in the usual manner.

20, 20 indicate two removable bins or carriers, somewhat narrower than the car platform and shorter than the available space in front or behind the center post 15. These bodies are preferably made in skeleton form for lightness. 25 in Figs. 2 and 3 indicates an automobile truck frame which has a supporting floor on approximately the same level with the car floor 10. This frame is adapted to take either of the bodies 20 carried by the trolley car. Thus, the trolley car and the automobile frame are so related in dimensions that the trolley car may conveniently carry two of the bodies which will interchangeably fit the truck frame.

Figures 4, 5, 6:
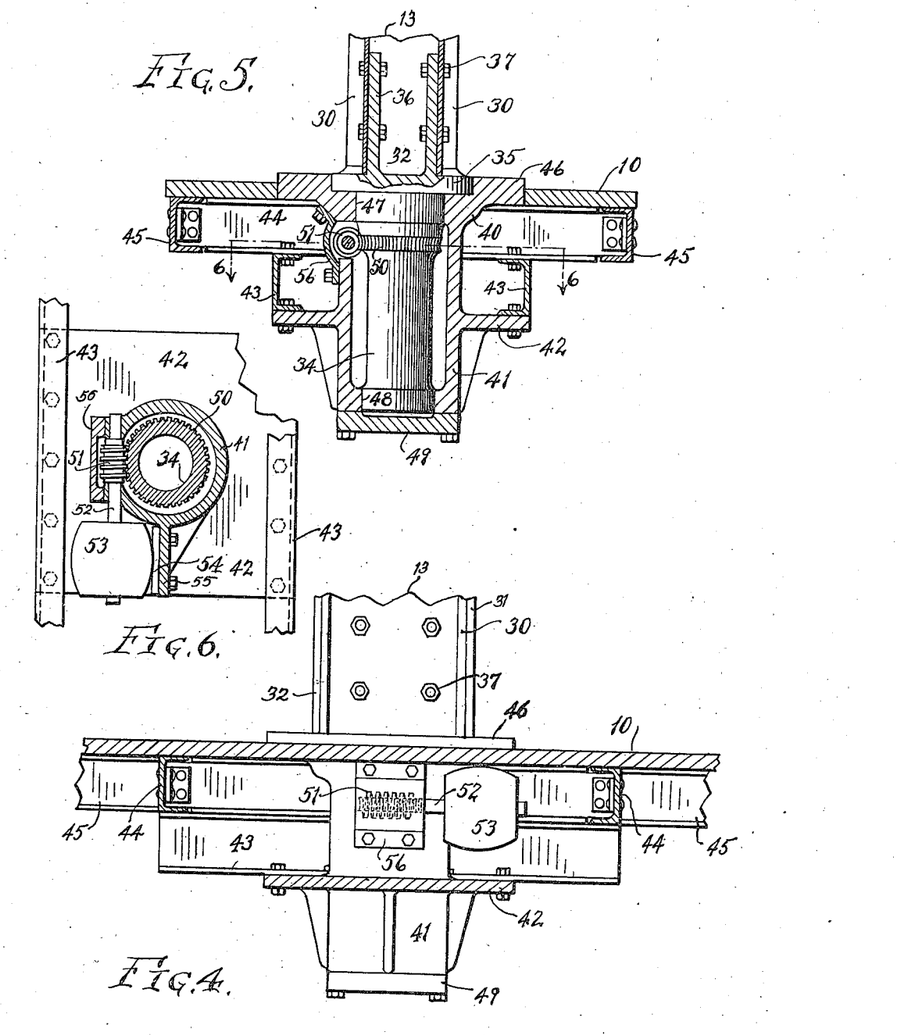
Fig. 4 is an enlarged elevation of the parts of the lower portion of the swiveled post, showing the means for swinging it, some of the parts being sectioned longitudinally of the car.
Fig. 5 is a vertical cross section of the same parts in a plane at right angles to Fig. 4 and transversely of the car.
Fig. 6 is a horizontal sectional detail taken on the line 6—6 of Fig. 5.

To raise or lower the bodies and swing them to or from the trolley car, I provide a crane arm and raising mechanism carried by the central post 13. This construction will now be described. The central post is shown as built up of a pair of upright channel beams 30 and edge plates 31 and 32, making a hollow vertical box-like post. The base of the hollow post is secured to a solid vertical axle 34 which is shown in Fig. 5 as having a collar portion 35, to take the downward thrust, and the upward extensions 36 bolted at 37 to the webs of the channel beams 30. This axle seats in a stationary bearing box 40 mounted in and secured to the trolley car platform.

As shown, the bearing box 40 has a tubular body portion 41 provided with a rectangular flange 42 bolted to channel beams 43 which in turn are secured to transverse channels 44 forming part of the platform structure. These transverse channel beams are shown as secured at their ends to longitudinal beams 45 which extend the length of the car and provide side sills. These side sills and the cross beams 44 support the floor. When the bearing box is mounted in place, its circular head 46 occupies a round opening in the floor. The collar 35 on the swivel post is shown as occupying a recess in the head 46 whereby this head takes the thrust. The lateral strain on the post is borne by the cylindrical bearing surfaces 47 and 48 near the top and bottom of the box. A suitable cap 49 at the lower end of the box may close it.

It will be seen that the construction described gives a very firm footing of the central post in the car body and swivels it thereto. To turn this post, I provide it with the worm wheel 50 (Figs. 5 and 6) with which meshes a worm 51 on the armature shaft 52 of a motor 53. This motor is suitably supported, as for instance by having its base 54 bolted to a bracket 55 shown as integral with the body 41. The worm occupies a recessed portion of the bearing box, the worm shaft preferably having an end bearing in the box. A suitable removable cap 56 covers the worm and allows access thereto when necessary.

Figures 3, 9, 10:
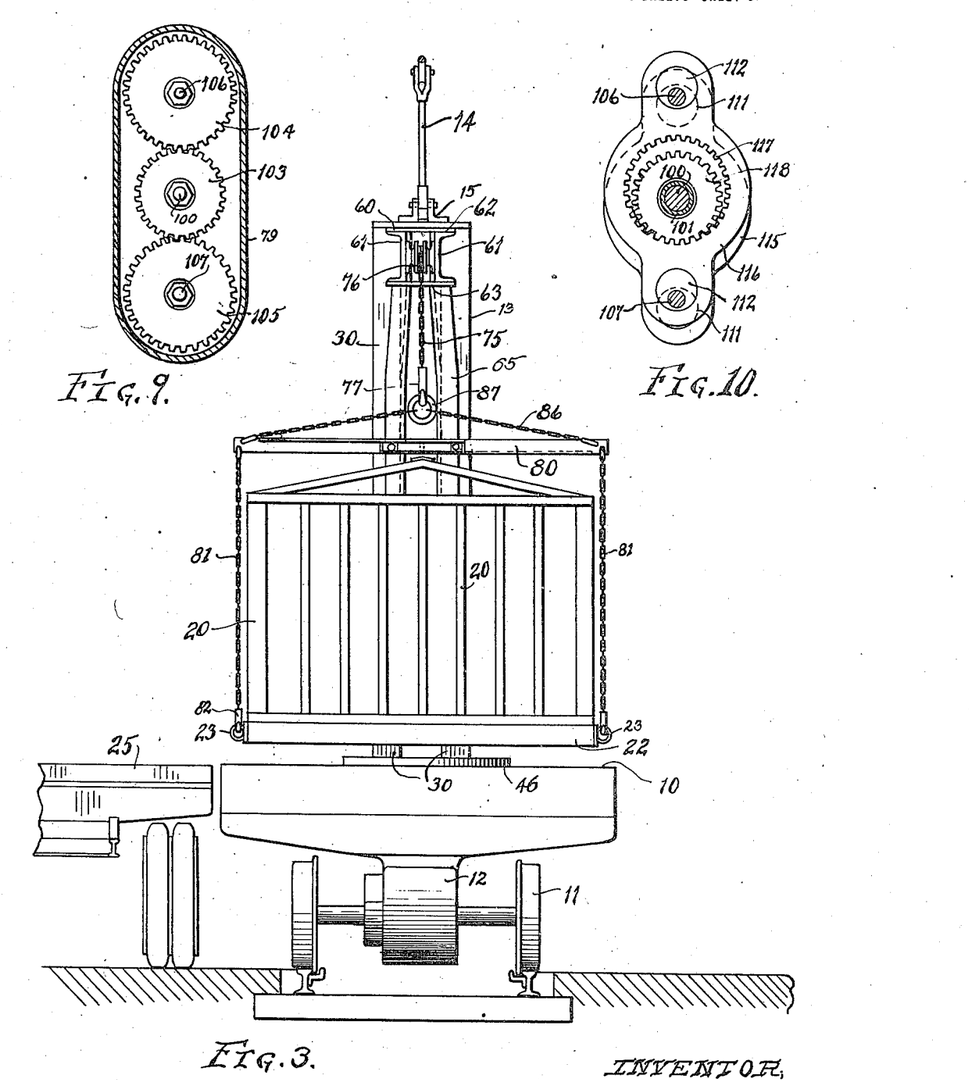
Fig. 3 is an end elevation on a larger scale of the trolley car and a portion of the adjacent truck body, this view showing the removable body as it is being raised.
Figs. 9 and 10 are vertical sectional details of the raising mechanism shown in the drawings, these sections being taken on planes indicated at 9—9 and 10—10 on Fig. 8.

The vertical central post 13 carries a crane arm 60 extending from the upper portion of the post preferably horizontally and adapted to stand a suitable distance above the bins 20. This crane arm, as shown in Fig. 3, consists of a pair of outwardly facing channel beams 61 having horizontal plates 62 and 63 secured to their upper and lower flanges. The web portions of the beams 60 extend into the vertical post along the inner faces of the upright channels 30 and are secured to such faces. The arm is suitably braced, as for instance by struts 65, which are shown as channel beams having their flanges removed adjacent to the ends and extending between the vertical post and crane arm respectively and secured thereto.

Figure 8:
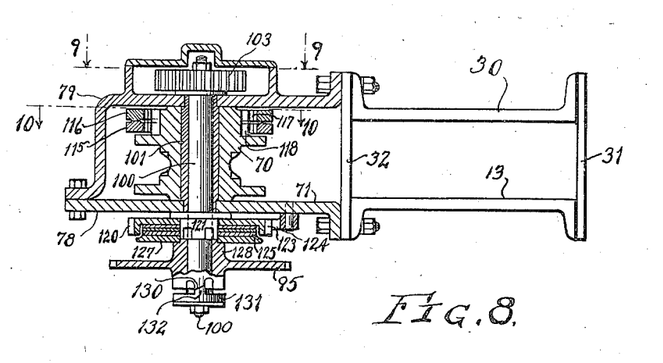
Fig. 8 is a sectional plan of such parts through the axis of the raising wheel.

70 in Fig. 8 designates a pocket wheel mounted in a casing 71 secured to the edge of the vertical post opposite the crane arm 60. A chain 75 (Figs. 1 and 3) lies over this wheel and extends horizontally within the crane arm and passes downwardly over a sheave 76 journaled within the crane arm near its forward end. This chain may be suitably connected to the removable body so that by rotating the lift wheel 70 the body may be raised. Then, by operating the motor 53, the body may be swung to one side or the other, as desired. This will be more fully explained hereafter.

The removable body has suitable floor beams 22 which have at their ends eyes 23. To connect the chain 75 with these eyes, I prefer to provide a stiff floating spider member 80 which may be supported centrally by the depending chain 75 and may carry four vertical chains 81, each provided at its lower end with a hook 82 adapted to engage one of the eyes 23. By such construction, the vertical pull on the chain 75 results in a vertical lift on the chains 81 without any lateral strain on the car body.

It is convenient to make the spider 80 of angle irons intermediately crossing each other in the form of a letter X and connected by suitable braces 85. The chains 81 are anchored at their upper ends to the outer portions of these angle irons. Adjacent to such anchorage on each arm is a chain 86. These four latter chains extend diagonally toward each other and are connected to a common ring 87 which may be engaged by the hook 77 on the end of the chain 75.

Figure 1:
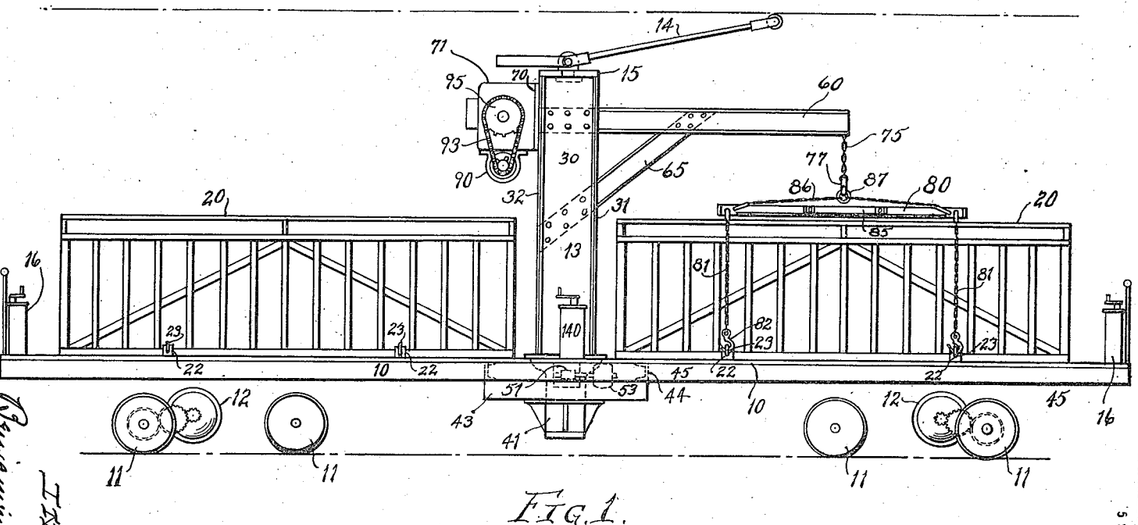
Figure 1 is a side elevation of one of my trolley freight cars.
Figure 2:
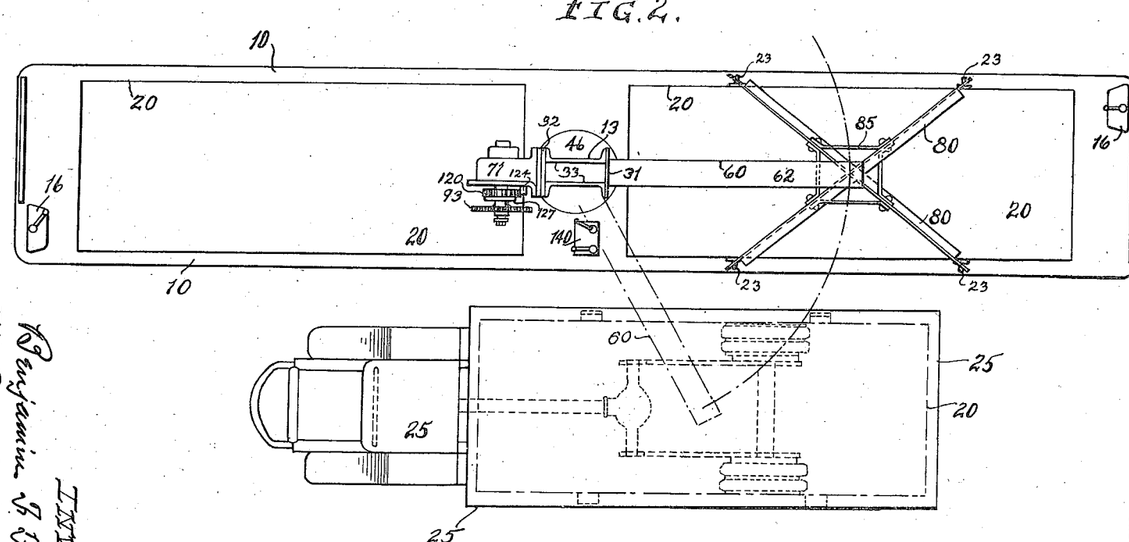
Fig. 2 is a plan thereof together with an automobile truck in position to receive the body, (the trolley pole is omitted in this view for clearness of illustration)
Figure 7:
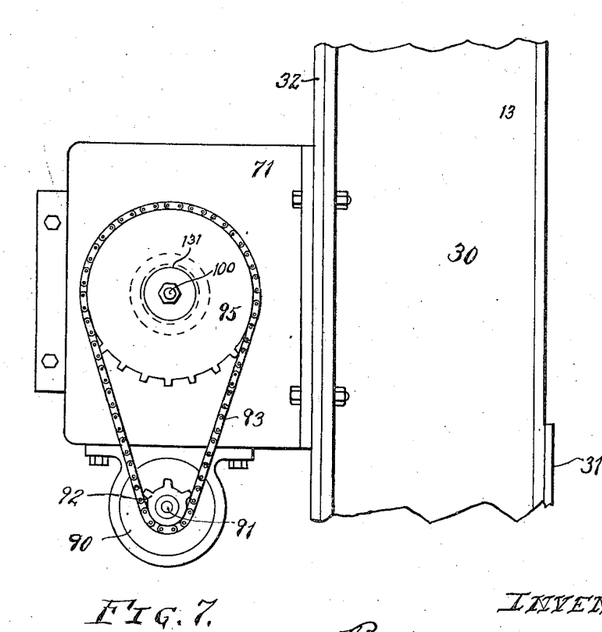
Fig. 7 is an enlarged side elevation of the mechanism for operating the raising chain.

90 in Figs. 1 and 7 indicates a suitable electric motor for rotating the lift wheel 70. Some powerful gearing is preferably employed between the armature shaft 91 of this motor and the lift wheel. The mechanism shown is the so-called cyclone movement, described and claimed in Patent No. 946,253, granted January 11, 1910 to Edward Y. Moore. This will now be described with particular references to Figs. 7 to 10 inclusive.

On the armature shaft 91 is a sprocket pinion 92 connected by a sprocket chain 93 with a sprocket wheel 94 mounted loosely on a shaft 100. This shaft extends axially through the lift wheel 70 and is journaled in a stationary sleeve 101 which has its ends mounted in the side plates 78 and 79 of the casing 71. The shaft 100 extends through the sleeve beyond the plate 79. At this point it is provided with a pinion 103. This pinion meshes with a pair of pinions 104 and 105 above and below it respectively, which are on shafts 106 and 107 journaled in the plate 79. Between the plates 79 and 78 these two shafts 106 and 107 each rigidly carry a pair of eccentrics 111 and 112. The two eccentrics 111 on the two shafts 106 and 107 extend in the same direction. The two eccentrics 112 also extend in one direction opposite to that of the eccentrics 111. The eccentrics 111 occupy circular openings in the yoke 115 and the eccentrics 112 similar openings in the yoke 116. Each of these yokes are provided with internal gear teeth 117 which surround and engage a single spur gear 118 formed on the hub of the lift wheel 70.

It results from the above construction that when the shaft 100 is rotated, the eccentrics are rotated all in the same direction, which gives circular translations or gyrations to the two yokes. This action gives a slow rotation to the spur-gear 118 and the lift wheel 70, the rate of speed of rotation depending on the difference between the numbers of teeth on the spur gear and on the yoke. It will be seen, therefore, that the motor may produce a very powerful raising pull on the lift chain.

To enable the load to run down freely under the control of a brake whenever desired, I provide a very simple and effective braking mechanism shown and claimed in Patent No. 794,997, granted July 18, 1905 to Edward Y. Moore. Briefly described, this brake includes a metal cup 120 loosely journaled on an enlargement 121 rigid with the shaft 100 and carrying on its exterior ratchet teeth 123 engaged by a pawl 124 carried by the frame plate 71, the ratchet teeth being in such direction that they may click idly under the pawl when the load is raised. 125 indicates a series of friction disks mounted on the enlargement 121 and alternately secured to the enlargement and to the ratchet cup. This is readily effected by flattening or squaring a portion of the enlargement and providing one set of alternate disks with square openings and smooth peripheries and alternate disks with round central openings and lugs at their peripheries engaging recesses in the wall of the cup. 127 indicates a pressure plate slidably mounted on the enlargement. Against this plate bears the hub 128 of the wheel 95. This wheel is loose on the shaft 100 and has on the outer face of its hub an incline or cam 130 which bears against a correspondingly inclined shoulder 132 on a collar 131 rigidly secured to the shaft.

The result is that when the wheel 95 is turned in the direction to cause the incline 130 to ride up on the incline 132, the wheel 95 is thereby forced inwardly, clamping the disks so that the hand wheel, disks, cup and shaft 100 all rotate as a unit, the ratchet wheel moving idly under the pawl. When the elevation ceases, the clamped brake holds the cup rigid with the shaft, and the pawl thus holds the load against descending. To lower the load, the wheel 95 is turned backwardly by its motor 90, thus relieving the cam clamping action of the inclined shoulders 130 and 131 and releasing the disks and allowing the load to descend. This descent will continue so long as the wheel 95 is kept turning in advance of the backward rotation of the shaft 100. To stop the descent, the rotation of the wheel 95 is stopped and thereupon the rotation of the shaft immediately forces the wheel 95 inwardly to again clamp the brake.

It will be seen that my mechanism provides for swinging the crane post in either direction and for raising or lowering the load. To effect this, the two motors 53 and 90 are reversible. Each of these motors receives its current through the same trolley pole 14 which supplies propelling current. I provide a suitable controller for distributing the trolley current to the motor 90 or 53, as desired. This controller is designated 140 (Figs. 1 and 2) and is shown as provided with two handles, one for the swinging motor and the other for the raising motor, the movement of either handle in one direction causing the corresponding motor to revolve in one direction and the movement of the handle in the opposite direction reversing the motor, the intermediate position of each handle being neutral.

With the trolley car described, the loaded bodies may be raised from an adjacent truck or from the ground or suitable platform and deposited on the car, it being only necessary for the operator to manipulate the two handles of his controller 140 to swing the crane and pull up on the chain 75. After the first body is deposited on the platform a slight lowering of this chain allows the hooks 82 to be disconnected, and then the crane is swung to the side and another body may be placed on the other end of the car. The chains and hooks may be left in this engaged position and the trolley car driven in the usual manner under the control of the controller 16 to its unloading point.

When the car is to be unloaded, the operator simply manipulates the handles of his controller 140, raising the loaded body and swinging it to the side and then lowering it onto an awaiting truck frame, or, if no truck frame is ready, onto the ground or suitable platform. For the most efficient despatch of goods there should be two truck frames available when the trolley car arrives, but, if this is not the case, one or both bodies may be simply deposited at the side of the trackway and the trolley freight car may proceed or return. As soon as a subsequent trolley freight car arrives, the deposited body may be raised by the crane of the car and placed on truck frames. It is unnecessary to provide any transfer platforms or freight station at the transfer point, a convenient arrangement being to have a single track, the space on one side of which may be used for the automobile trucks and the space on the other side for the deposit of bodies when the truck is not available.

Having thus described my invention, what I claim is:

1. The combination of an electric trolley car having a supporting platform, a removable body adapted to rest on the platform, a motor truck adapted to receive and transport such removable body, a crane carried by the car, and a trolley pole mounted on the crane, said crane being adapted to be operated by current from the trolley and swing the body to the motor truck.

2. The combination of a trolley car having means for supporting a removable body, a vertical swivel post mounted on the trolley car, a lateral arm carried by said post, a flexible raising member depending from the arm, an electric motor for operating the raising member, an electric motor for propelling the car, and a trolley pole swiveled to said post and adapted to collect current for both motors.

3. The combination with a removable truck body, of a trolley car having means for supporting such removable body, a swiveled post carried by the trolley car, a lateral arm carried by said post, a flexible raising member depending from the arm, an electric motor for operating the raising member, an electric motor for propelling the car, a current collector carried by the car adapted to supply current to both motors, the lateral arm being adapted to overhang the side of the car by a distance at least as great as half the width of the removable body but not as great as the distance from the post to the end of the car, and a motor truck adapted to receive and transport such body.

4. The combination of an electric car having a platform, a removable body adapted to rest on said platform, a swiveled post, a lateral arm carried thereby, raising mechanism supported in part by the arm and including an electric motor and adapted to engage and lift the removable body, a trolley pole having its base mounted on said post, and means for distributing current from the trolley pole to the raising motor.

5. The combination of a car having a supporting platform, a removable body adapted to rest thereon, a vertical swiveled post having a lateral arm, flexible raising mechanism mounted in part at least on the arm and adapted to be connected with the removable body, electro-magnetic means for operating the raising mechanism and for swinging the post and for propelling the car, and a trolley pole having a base mounted on the upright post and supplying current for said electro-magnetic means.

6. The combination of a car having a flat platform adapted to support a removable body and having an upright swiveled post, a trolley pole swiveled on a base secured to the top of the post, a lateral arm extending from the side of the post, and electrically operated raising mechanism carried in part by said arm an adapted to lift the removable body to and from said platform.

7. The combination, with a flat trolley car, of a central vertical post swiveled thereto, a trolley pole secured to the top of the post by a swivel connection, a motor for rotating the post, a lateral arm extending from the post, raising mechanism mounted at least in part on the arm, a motor for operating the raising mechanism, a pair of removable bodies adapted to stand on the platform respectively in front of and behind the post, and an automobile truck frame adapted to receive either body interchangeably.

8. The combination of a flat car, a pair of removable bodies adapted to rest on the car respectively in front of and behind the center, a vertical post mounted at the center of the car and swiveled in a bearing secured to the car body and depending below the platform, a lateral arm extending from the post for a distance greater than half the length of the body, the length of the arm from the axis of the post being also greater than half the width of the car plus half the width of the body, raising mechanism depending from the free end of the arm and adapted to engage the removable body, and means for operating the raising mechanism and for turning the post.

9. The combination of a flat car, a pair of removable bodies adapted to rest on the car respectively in front of and behind the center, a vertical post mounted at the center of the car and swiveled thereto, a lateral arm extending from the post for a distance greater than half the length of the body, the length of the arm from the axis of the post being also greater than half the width of the car plus half the width of the body, raising mechanism depending from the free end of the arm and adapted to engage the removable body, electro-magnetic means for operating the raising mechanism and for turning the post, a trolley pole swivelly connected to the top of the post, and circuits and a controller between the trolley pole and the electro-magnetic raising and turning means.

10. The combination of a flat car, a removable body adapted to rest thereon, a vertical post rising from the center of the car and swiveled in a bearing box depending below the car floor, a lateral arm extending from the post, power raising mechanism, a flexible lift member operated thereby and depending from the arm, four flexible members connected with the lift member and adapted to engage the removable body at two points on each side, and mechanism for turning the post on its axis.

11. The combination of a flat car, a removable body adapted to rest thereon, a vertical post rising from the center of the car and swiveled in a bearing box depending below the car floor, a lateral arm extending from the post, power raising mechanism on the opposite side of the post from the arm, a flexible lift member extending therefrom across the post and within the arm and depending, means connecting the same with the removable body, a motor for operating the power mechanism, a motor for turning the post on its axis, and a trolley pole swiveled to the upper end of the post and adapted to convey current for both motors.

12. The combination of a long, narrow flat car, a vertical post swiveled to the car body and rising from the flat floor thereof at the center of the car, two removable bodies adapted to stand respectively on the car floor in front of and behind the post and within the side lines of the car, a lateral arm extending from the post and adapted to reach over the center of either body, the bodies, car and arm being so proportioned that the said arm may overhang the side of the car by a distance greater than half the width of the body, a flexible raising member mounted in part on the arm and depending from its free end, a floating frame connected to the flexible raising member, four chains depending from the floating frame, each body having four eyes adapted to be engaged by hooks on the ends of said chains, whereby the body may be raised and maintained level.

13. The combination of a long, narrow flat car, a vertical post swiveled to the car body and rising from the flat floor thereof at the center of the car, two removable bodies adapted to stand respectively on the car floor in front of and behind the post and within the side lines of the car, a lateral arm extending from the post and adapted to reach over the center of either body, the bodies, car and arm being so proportioned that the said arm may overhang the side of the car by a distance greater than half the width of the body, a flexible raising member mounted in part on the arm and depending from its free end, means connecting the raising member with the body to raise it while maintaining it level, an electric motor for operating said raising member, an electric motor for turning the post, an electric motor for propelling the car, a trolley having its pole swiveled to the top of said post, conductors for supplying current from said trolley to the three motors mentioned, and controllers for the various motors.

14. The combination of a trolley car having means for supporting a removable body, a crane on the trolley car, a flexible raising member depending from the crane in position to be vertically above the car, an electric motor for propelling the car, and a trolley pole swiveled to said post and adapted to collect current for said motor.

15. The combination of a car having a flat platform adapted to support a removable body and having an upright swiveled post, a trolley pole swiveled on a base secured to the top of the post, a lateral arm extending from the side of the post, and electrically operated mechanism for turning said post.

16. The combination, with a flat trolley car, of a central vertical post swiveled thereto, a trolley pole secured to the top of the post by a swivel connection, a lateral arm extending from the post, raising mechanism mounted at least in part on the arm, a motor for operating the raising mechanism, a pair of removable bodies adapted to stand on the platform respectively in front of and behind the post, and an automobile truck frame adapted to receive either body interchangeably.

17. The combination of a flat car, a removable body adapted to rest thereon, a crane mounted on the car, a flexible lift member operated thereby, four flexible members connected with the lift member and adapted to engage the removable body at two points on each side, and mechanism for swinging the crane on its axis.

18. The combination of a flat car, a removable body adapted to rest thereon, a vertical post rising from the car, a lateral arm extending from the post and adapted to turn about the axis of the post, power raising mechanism on the opposite side of the post from the arm, a flexible lift member extending therefrom across the post and within the arm and depending, means connecting the same with the removable body, a motor for operating the power mechanism, and a trolley pole mounted to the upper end of the post and adapted to convey current for said motor.

19. The combination of a car, a removable body adapted to rest thereon, a crane mounted on the car and having a flexible raising member, a floating frame connected to the flexible raising member, four chains depending from the floating frame, each body being adapted to have a hooked engagement with the ends of the four chains at isolated points, whereby the body may be raised while being maintained level.

20. The combination of a flat car, a crane mounted thereon adjacent to the center of the car, two removable bodies adapted to stand respectively on the car floor in front of and behind the crane and within the side lines of the car, the arm of the crane being adapted to reach over the center of either body, the bodies, car and arm being so proportioned that the same arm may overhang the side of the car by a distance greater than half the width of the body, a flexible raising member mounted in part on the arm and depending from its free end, means connecting the raising member with the body to raise it while maintaining it level, electro-magnetic means for operating the raising member and for propelling the car, a trolley having its pole mounted on the crane, and conductors for supplying current from this trolley to the electro-magnetic means.

21. The combination, with a flat trolley car, of a central vertical post carried thereby, a trolley pole secured to the top of the post by a swivel connection, a swinging arm carried by the post, raising mechanism mounted at least in part on the arm, a motor for operating the raising mechanism, a motor for propelling the car, electric conductors and controlling devices between said motors and the trolley, a pair of removable bodies adapted to stand on the platform respectively in front of and behind the post, and an automobile truck frame adapted to receive either body interchangeably.

In testimony whereof, I hereunto affix my signature.

BENJAMIN F. FITCH.